US005669841A

United States Patent [19]
Schick

[11] Patent Number: 5,669,841
[45] Date of Patent: Sep. 23, 1997

[54] TWISTED BELT TENSIONER

[75] Inventor: Scott Schick, Corydon, Iowa

[73] Assignee: Shivvers, Inc., Corydon, Iowa

[21] Appl. No.: 588,349

[22] Filed: Jan. 18, 1996

[51] Int. Cl.$^6$ ........................................ F16H 7/12
[52] U.S. Cl. ........................................ 474/135
[58] Field of Search ........................ 474/135, 133, 474/138, 136, 101, 61, 62, 63, 64; 56/14.7; 74/15.63; 180/366, 373

[56] References Cited

U.S. PATENT DOCUMENTS

| | | | |
|---|---|---|---|
| 819,377 | 5/1906 | Price | 180/366 |
| 1,783,713 | 12/1930 | Holman . | |
| 2,191,155 | 2/1940 | Mattison . | |
| 2,663,195 | 12/1953 | Horan . | |
| 2,806,382 | 9/1957 | Gehrke . | |
| 3,025,658 | 3/1962 | Steichele et al. | 474/135 |
| 3,311,186 | 3/1967 | Kamlukin | 74/15.63 |
| 3,691,860 | 9/1972 | Danuser | 474/63 |
| 4,121,475 | 10/1978 | McIlwain . | |
| 4,983,144 | 1/1991 | Ojima | 474/111 |
| 4,990,125 | 2/1991 | Stuemky et al. | 474/261 |
| 5,042,239 | 8/1991 | Card | 56/14.7 |
| 5,152,721 | 10/1992 | Sajczvk et al. . | |
| 5,418,600 | 5/1995 | Genovese . | |

Primary Examiner—Tamara L. Graysay
Assistant Examiner—Tony Boyd
Attorney, Agent, or Firm—Litman, McMahon and Brown, L.L.C.

[57] ABSTRACT

A belt tensioner for a twisted belt that tends to elongate during usage includes a tensioning pulley for operably engaging the twisted belt, a carrier for the pulley pivotally connected to a frame, a tensioning device for applying continuous force to the tensioning pulley carrier so as to tension the belt, and an unidirectional locking mechanism that allows the carrier to swing in only one direction and not in a reverse direction.

16 Claims, 3 Drawing Sheets

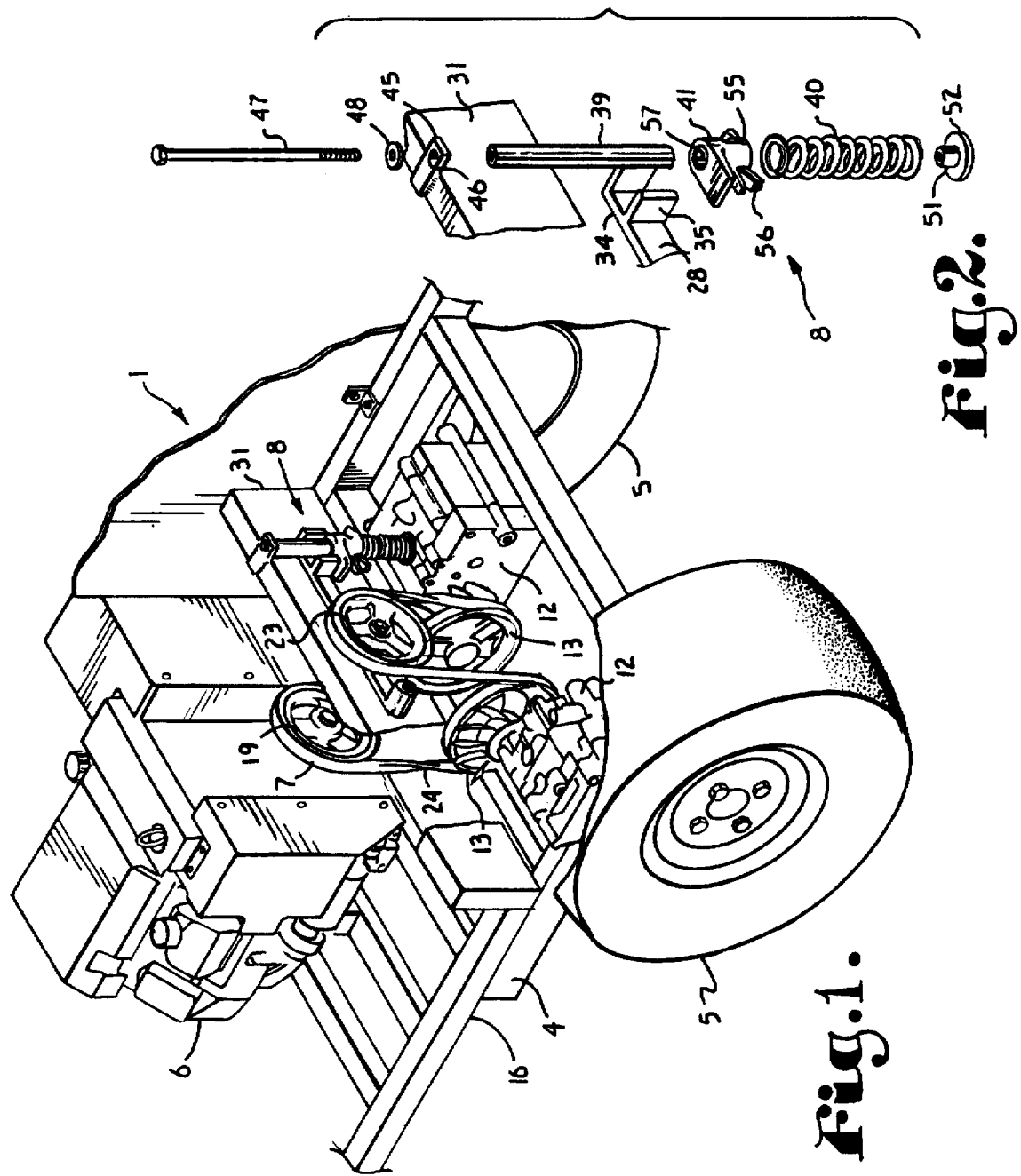

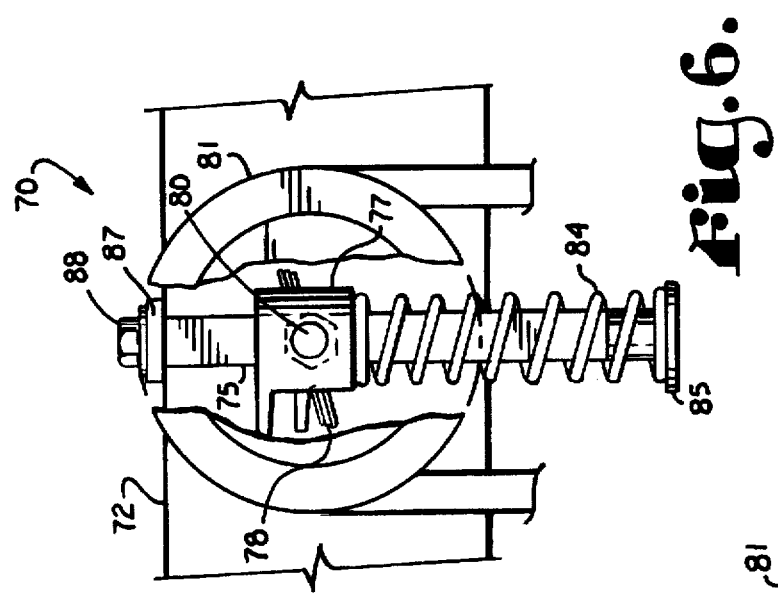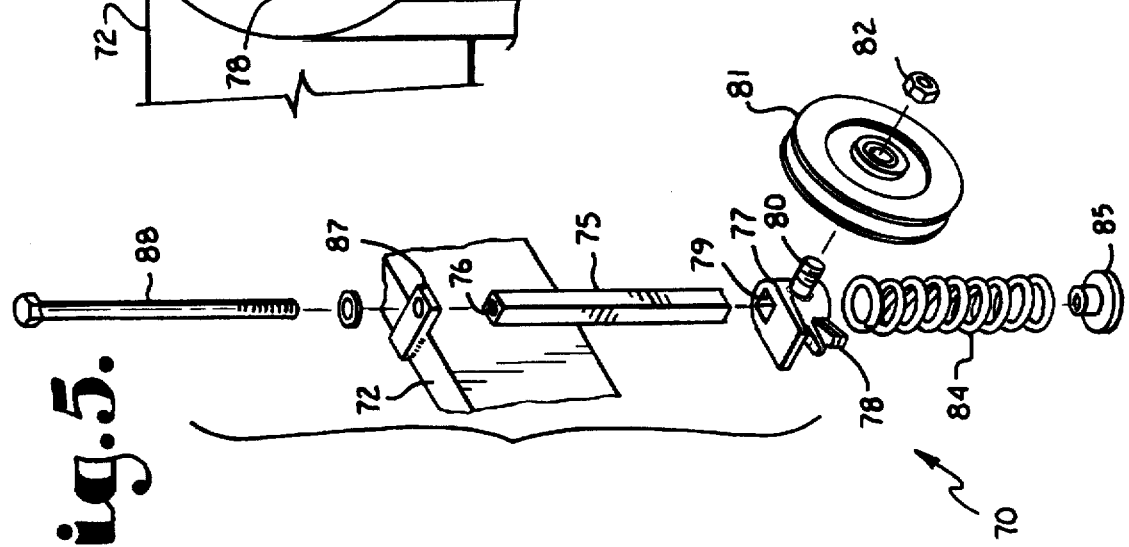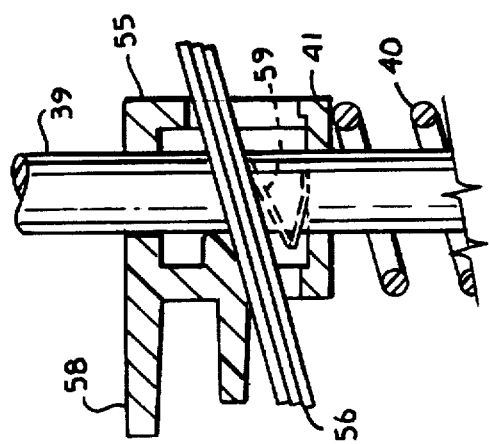

TWISTED BELT TENSIONER

BACKGROUND OF THE INVENTION

The present invention is directed to a belt tensioner, especially a twisted belt tensioner for applying a continuous tension within a preferred tension range to a belt, as the belt elongates. More particularly, the tensioner of the present invention allows for the taking up of slack in a twisted belt, as the belt elongates, while maintaining tension on the belt within a preferred tension range and without dropping below a minimum tension so that the belt is unlikely to twist out of or be thrown from a pulley carrying the belt.

Twisted belts are commonly utilized to drive two opposing shafts in opposite directions from a single motor. That is, the belt is reeved about pulleys that drive the shafts that are aligned along a common axis and which in turn rotate wheels or the like. The belt is further reeved about a third pulley attached to a motor and a fourth tensioning pulley which functions to apply tension and take up slack in the belt.

Between each of the belt engaging pulleys, the belt is necessarily twisted a partial turn. While twisting of the belt allows the belt to traverse its serpentine path, it presents mechanical difficulties in that the twisting of the belt makes the belt susceptible to being thrown from or twisted out of the belt groove associated with one of the pulleys.

To reduce the likelihood that the belt will be thrown from one of the pulleys in the system, pressure is applied to the belt by the belt tensioning pulley so as to exert an over all tension on the belt which in turn increases the likelihood that the belt will stay within the grooves associated with the pulleys. Applying too much tension to the belt may substantially shorten the life expectancy of the belt or put wear upon the associated system. However, applying too little tension to the belt allows the twists in the belt to twist or torque the belt out of the grooves of one or more of the pulleys. The preferred belt for use in such a system has a V-shape, but is subject to rolling over within the grooves of the pulleys, if there is insufficient tension. Rolling over and reversing in one of the grooves will substantially reduce the life expectancy of the belt and the torque transmission capabilities thereof such that the belt will not transmit as much power.

Tensioning devices have often been applied to both twisted and untwisted belts to maintain a preferred preselected tension on the belt. Such tensioning devices often consist of some type of a device having a pivot arm upon which is mounted the tensioning pulley and which is in turn biased to tension the belt riding on the pulley by a spring or other biasing mechanism. The problem with conventional devices of this type for applying tension to belts is that under certain circumstances, such as the application of a load or at startup, force may be applied against the tensioning pulley which acts counter to the biasing force applied by the spring or whatever mechanism is used for biasing the pulley in such a manner as to substantially reduce the tension applied to the belt somewhere within its path. The belt can then easily twist in a groove of one of the pulleys and either come out of the groove of one of the pulleys or rotate within the groove.

Consequently, it is desirable to have a twisted belt tensioner which is capable of maintaining tension upon a belt preferably within a preselected range, but which does not allow the tensioning device to reduce tension on the belt during certain operational stages, such that less tension is applied to the belt then is preferred and thereby reduce the likelihood that the belt will rotate in a pulley groove or twist from the pulleys.

SUMMARY OF THE INVENTION

A belt tensioner is provided for use in conjunction with a drive belt of the type that is prone to elongation during extended usage. The tensioner is especially suitable for use in conjunction with twisted belts that are designed to be threaded along a path defined by a series of pulleys or other drive devices which are aligned such that the axes of rotation are not parallel and, in particular, with respect to pulleys which have axes of rotation that are aligned at approximately 90° relative to one another.

The tensioner includes a carrier which preferably rotatably supports a belt tensioning pulley about which a twisted belt is reeved. The carrier is connected to a fixed frame associated with the overall apparatus, but is unidirectionally moveable relative to the frame along a particular path. The path of the tensioning pulley on the carrier may be arcuate or linear.

A biasing mechanism, especially a compression spring, is provided for applying a force in a preferred direction to the carrier so as to continuously bias the tensioning pulley along the pathway thereof. In this manner the twisted belt has a continuous tension applied thereto which is preferably maintained within a preselected range that is dependent upon the force exerted by the biasing mechanism against the carrier.

A locking mechanism also acts upon the carrier. The locking mechanism functions to allow the carrier and the associated tensioning pulley to move along the path as biased by the biasing mechanism in only a single direction. That is, the biasing mechanism applies a continuous force to the carrier and consequently to the tensioning belt along one direction of the path, but the locking mechanism prevents movement in the opposite direction. This allows a tension to be applied to the belt which is dependent upon the force applied by the biasing mechanism and which preferably remains within a preferred tension range to continuously take up any slack or extension of the belt during the life of the belt, but does not allow the belt to become slack through movement of the carrier and tensioning pulley backwards along the path. In this manner the belt is not likely to become sufficiently loose or untensioned on any of the pulleys of the system to twist free from one of the pulleys or to rotate within grooves of one of the pulleys.

OBJECTS AND ADVANTAGES OF THE INVENTION

Therefore, the objects of the present invention are: to provide a belt tensioning apparatus that applies a continuous tension to a drive belt by applying a force in one direction along a path against the drive belt and which further provides a locking mechanism which prevents the tension applied against the belt from dropping below minimum required to maintain the drive belt on associated pulleys or the like and prevent the belt from rotating and turning over within grooves of pulleys; to provide such an apparatus wherein the drive belt is a twisted drive belt having a plurality of pulleys at least some of which have axes of rotation that are aligned at approximately 90° relative to one another; to provide such an apparatus wherein one of the pulleys is a tensioning pulley and is carried by a carrier which is movably connected to a fixed frame and which further includes a biasing mechanism for urging the tensioning pulley along a pathway in a single direction; to provide such an apparatus wherein the biasing mechanism includes an elongate shaft operably secured at one end thereof to the fixed frame and includes a compression spring mounted along the shaft so as to bias against the locking mechanism;

to provide such an apparatus wherein the locking mechanism is a cam locking device that during operation allows movement in only a single direction along the shaft; and to provide such an apparatus which is relatively simple to construct, easy to use and particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary and perspective view of a motorized vehicle illustrating a twisted belt system and tensioner device therefor in accordance with the present invention, with portions broken away to better illustrate the invention.

FIG. 2 is an enlarged and exploded side elevational view of the tensioner device.

FIG. 4 is an enlarged and fragmentary side elevational view of a part of the tensioner device with portions broken away to show detail thereof.

FIG. 5 is an exploded view of an alternative embodiment of a tensioner device according to the present invention.

FIG. 6 is a fragmentary side elevational view of the alternative tensioner device.

DETAILED DESCRIPTION OF THE INVENTION

Figure 3:
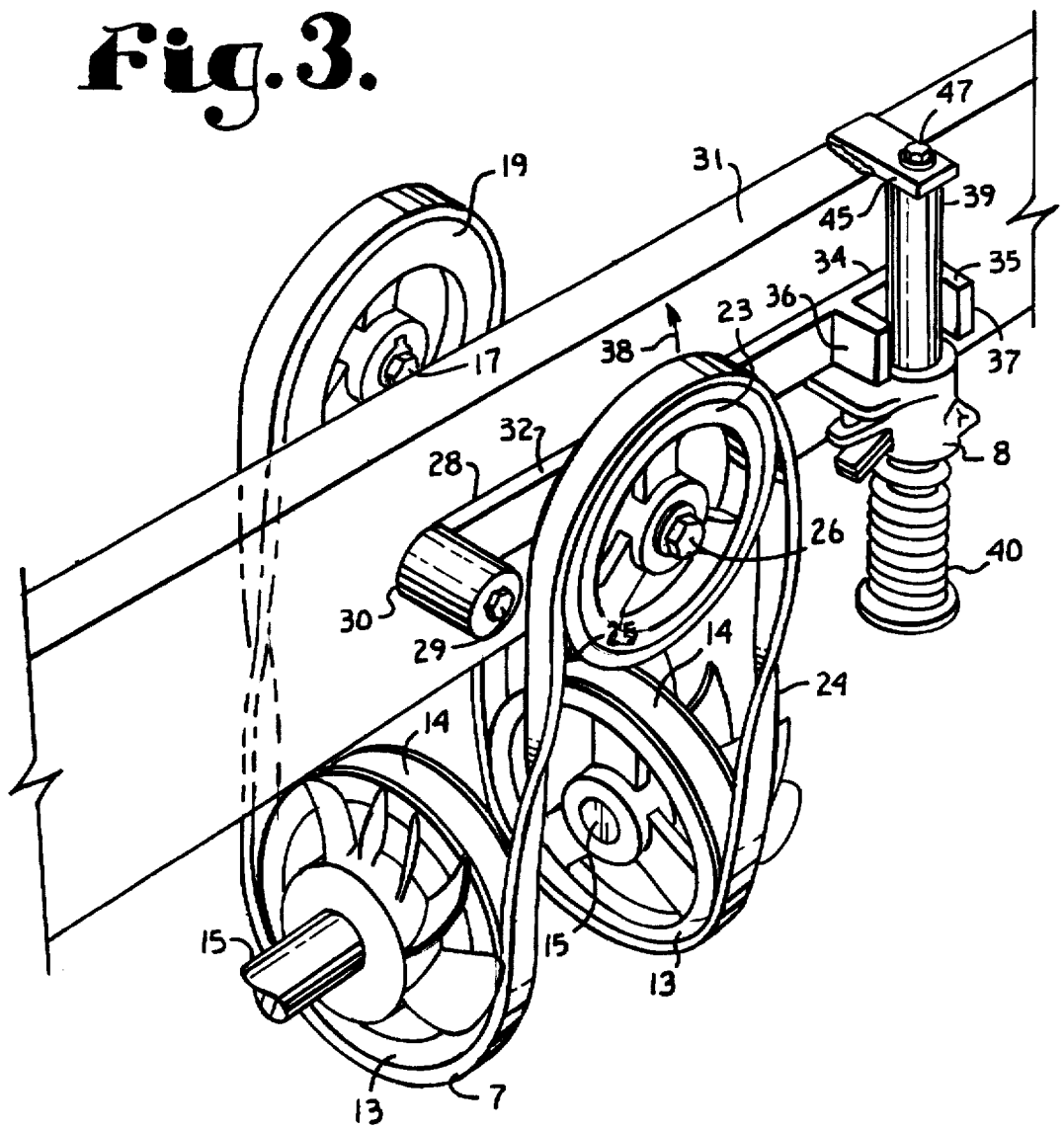
FIG. 3 is a further enlarged and perspective view of the twisted belt system and tensioner device with the remainder of the apparatus removed to better show detail of the invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally represents a motorized vehicle. The vehicle 1 includes a frame 4, a plurality of ground engaging wheels 5, a gasoline powered motor 6, a twisted drive belt system 7 and a tensioning device 8.

The vehicle 1 is partially seen in FIG. 1 wherein much of the vehicle has been eliminated or cut away in order to better illustrate the invention. The vehicle 1 may be any type of motorized vehicle, especially one having independently driven wheels, such as riding lawn mowers of the type which must make sharp turns which are commonly referred to as zero turning radius vehicles. In the zero turning radius vehicles at least one pair of the wheels 5 are connected directly to transmissions 12 which independently drive each of the wheels 5. In the present embodiment, the driven wheels 5 are the front wheels of the vehicle and there is a transmission 12 for each of the front wheels 5 having a drive shaft 15 that rotates coaxially with a respective pulley 13. Associated with each of the transmissions 12 is a drive pulley 13 having a circumferential groove 14. Both of the drive pulleys 13 rotate about a common axis, but in opposite directions.

The motor 6 is mounted upon a motor support frame 16 that is joined with the remainder of the vehicle frame 4 such that the motor 6 is generally supported by the vehicle 1. The illustrated motor 6 is a conventional gasoline driven engine, but it is foreseen that motors of virtually any type may be utilized in conjunction with the invention, including electric, diesel and hydraulic, etc. Extending outwardly from the motor 6 and positioned on a motor drive shaft 17 is a drive pulley 19 having a belt receiving circumferential groove. The drive pulley 19 is operably driven by operation of the motor 6 to rotate about a central axis thereof.

The twisted belt drive system includes the transmission pulleys 13, the drive pulley 19, a belt tensioning pulley 23 and a twisted belt 24. The belt tensioning pulley 23 rotates freely about an axis on a shaft or bolt 26 that is generally parallel to the axis of the motor drive pulley 19 and at times during operation the two axes are aligned or nearly aligned. The tensioning pulley 23 includes a groove 25. The twisted belt 24 is reeved to pass within the grooves 14 of pulleys 13, groove 25 of pulley 23 and the groove of the pulley 14 of the belt system 7 in such a manner that the twisted belt 24 engages the motor drive pulley 19 and, thereafter the left transmission pulley 13, thereafter the belt tensioning pulley 23 and finally the right transmission pulley 13 after which it returns to the motor drive pulley 19.

The pulleys 13 are approximately aligned to rotate about axes that are at 90° to the axis of the motor drive pulley 19 and belt tensioning pulley 23. The twisted belt 24 is thus twisted approximately a fourth turn along its length between any two of the pulleys 19, 13, 23 and 13 that engage the belt 24 along its path. While it is foreseen that the present invention works especially well with a twisted belt such as belt 24, it is also foreseen that the present invention could be utilized in conjunction with other types of belts that are subject to elongation during their useful life. It is also foreseen that the pulleys may be positioned to be at angles other than 90° relative to adjacent. For example, two pulleys may be aligned at 45° relative to each other in some systems.

The belt tensioning pulley 23 is mounted on a carrier 28 and rotates on the bolt 26 rotatably connecting the tensioning pulley 23 to the carrier 28. In this manner the bolt 26 functions as a connection of the pulley 23 to the carrier 28. The carrier 28 is in turn pivotally connected at a pivotal first end 30 thereof to a frame member 31 of the frame 4 by a pivot shaft or bolt 29. The carrier 28 has an elongate arm 32.

The carrier 28 has a second swingable end 34 which includes an engagement tab or fork 35 having a first tooth 36 and a second tooth 37. In this manner the belt tensioning pulley 23 is located on the carrier 28 between the pivot shaft 29 and the fork 35 such that movement of the fork 35 relative to the frame member 31 causes rotation of the carrier 28 upon the pivot shaft 29 and movement of the belt tensioning pulley 23 along an arced path.

It is possible to have the pulley 23 connected to the carrier 28 on either side of the tensioning device 8 or at the same position as the tensioning device 8 along the carrier 28 and relative to the carrier first end 30. As will be discussed later, the belt tensioning pulley 23 can move in only one direction along the path which direction is identified by the reference directional arrow labelled 38 in FIG. 3.

Because the carrier 28 rotates about the pivot shaft 29, the path followed by the center of the tensioning pulley 23 will necessarily be arcuate in nature, although it is foreseen in accordance with the invention that the pathway could be linear in nature. In particular, the carrier could be a slide mechanism which slides along a linear channel or shaft in a linear fashion as opposed to rotating with an angular motion, as in the present embodiment.

The tensioning device 8 is best seen in an exploded view in FIG. 2. The tensioning device 8 includes an elongate tubular member or shaft 39, biasing means or a biasing mechanism which in the present embodiment comprises a compression spring 40 and locking means or a locking mechanism 41.

An ear 45 is fixedly mounted to and extends outwardly from the frame member 31. The ear 45 includes an aperture 46 passing therethrough. Mounted through the ear aperture 46 is a shaft or bolt 47 which also has a washer 48 associated therewith. The bolt 47 passes through the tubular member 39, the spring 40 and is in turn secured at a distal end by a nut 51 having an expanded head 52. The nut head 52 is sufficiently large compared to the diameter of the spring 40 to hold the spring 40 thereon.

In this manner, when the tensioning device 8 is assembled, as seen in FIG. 3, the bolt 47 secures the overall tensioning device 8 to the frame member 31 to provide a fixed platform relative to the frame 4 so that the spring 40 is able to continuously bias the locking mechanism 41 toward the ear 45. The fork 35 of the tensioning pulley carrier 28 with one of the teeth 36 and 37 on either side of the tubular member 39 is positioned to abut against the locking mechanism 41 opposite the spring 40 and is moveable axially along the tubular member 39, but only in the direction of the ear 45 during operation of the vehicle 1. Thereby the spring 40 effectively biases the carrier fork 35 and consequently the belt tensioning pulley 23 along the previously described path thereof during operation of the vehicle 1.

While the biasing mechanism of the present invention is illustrated as a compression spring, it is foreseen that other types of biasing devices such as a tension spring, weight, air cylinder, pressure cylinder or the like could be utilized in conjunction with the present invention.

The locking mechanism 41, see especially FIG. 4, includes an annular body 55 with a central bore 57 slideably receiving the tubular member 39 therethrough and a plurality of cam plates 56 which operably lock against the tubular member 39, when the locking mechanism 41 is urged toward the spring 40, but allow the spring 40 to urge the locking mechanism 41, the carrier 28 and consequently the belt tensioning pulley 23 away from the spring 40. That is, the carrier 28 can move in one direction which is illustrated by the arrow 38 in FIG. 3 and which is in a somewhat arced and upwardly direction, as illustrated in FIG. 3, but is prevented from moving in the opposite direction. Cam locking mechanisms can be found in other non related arts such as is shown in U.S. Pat. No. 1,783,713 which is incorporated herein by reference.

The cam locking mechanism 41 is best seen in FIG. 4. Shown are 3 cam plates 56 that are stacked along the shaft 39 which passes through apertures in the plates 56 that have a diameter larger than that of the shaft 39. The plates 56 are wedged to be in a non radial configuration relative to the shaft 39, such as is seen in FIG. 4, by a spring 59 so that the plates 56 become wedged and lock when moving downward in FIG. 4, but allow movement of the body 55 upward along the shaft 39 in FIG. 4.

A tab 58 extends radially outward from the body 55 above the outer ends of the plates 56. The locking mechanism 41 is quick release or quick reset in that, when the vehicle 1 is not operating, an operator can easily and quickly release the one way lock of the mechanism 41 by pressing the outer ends of the plates 56 toward the tab 58 by exerting finger pressure thereon. As the plates 56 move to a radial alignment relative the shaft 39, the locking caused by the plates 56 is released and the body 55 can then be urged along the shaft 39 against the pressure of the spring 40 (downwardly as seen in FIG. 4). This allows the mechanism 41 to be quickly released to allow an operator to loosen and remove the belt 24 or to perform other maintenance on the vehicle 1.

Shown in FIGS. 5 and 6 is a second embodiment of a tensioning device in accordance with the present invention and identified generally by the reference numeral 70. The device 70 works in a similar manner to the device 8. In particular, the device 70 mounts on a frame member 72 that is essentially the same as frame member 31 of the previous embodiment except the place of mounting therealong is more centered. The device 70 functions with a vehicle of the type shown in the first embodiment or a similar device.

The tensioning device 70 includes a square shaft 75 having an axially aligned bore, slideably received in a similarly shaped bore 79 in an annular body 77. The body 77 includes locking plates 78 of the same type described as plates 56 in the previous embodiment. Mounted to extend radially outward from the body 77 is a shaft 80. Rotatably mounted on the shaft 80 is a belt tensioning pulley 81 with self contained bearings that is held on the shaft 80 by a nut 82 which in the present embodiment serves the same function as the pulley 23 of the previous embodiment. A spring 84 is sleeved on the shaft 75 and held in place by an end cap 85. The spring 84 biases the body 77 and consequently the pulley 81 in a generally linear path parallel to the shaft 75 (upward in the view shown in FIG. 6).

The tensioning device 70 is secured to the frame member 72 at a tab 87 by a bolt 88 that passes through the shaft 75 and the spring 84. The shaft 75 is secured by the end cap 85. The body 77 is received on and slides unidirectionally along the shaft 75.

The locking mechanisms shown in the illustrated embodiments are each quick release and can be reversed under control of an operator when the vehicle 1 is not operating. It is foreseen under the invention that other types of locking mechanisms could be utilized such as are generally known as "nobacks". Among the locking mechanisms usable are spring clutches, roller bearing clutches and the like.

It is to be understood that while certain forms of the present invention have been illustrated and described herein, it is not to be limited to the specific forms or arrangement of parts described and shown.

What is claimed and desired to be secured by Letters Patent is as follows:

1. A tensioning mechanism for a drive belt comprising:

a) a tensioning pulley adapted for operably engaging the drive belt and applying tension thereto;

b) a tensioning pulley carrier rotatably supporting the tensioning pulley and adapted to be connected to a frame such that an axis of rotation of said tensioning pulley is moveable along a path with respect to said frame;

c) a tensioning device connected to said tensioning pulley and operably applying a force to said tensioning pulley to urge said pulley axis along said path so as to tension the drive belt; and d) a locking mechanism operably unidirectionally moveable along said path and connected to said tensioning device and operably allowing said tensioning pulley axis to move in only one direction along said path.

2. The tensioning mechanism according to claim 1 in combination with the drive belt and wherein:
   a) said belt is a twisted belt.
3. The tensioning mechanism according to claim 1 wherein said carrier comprises:
   a) an elongate arm with said tensioning pulley being rotatably mounted onto said arm;
   b) said arm having a first end spaced from a connection with said tensioning pulley; said first end being adapted to be pivotally connected to the frame; and
   c) said arm operably engaging said tensioning device at a location therealong spaced from said first end such that said tensioning device biases said arm to swing about said first end.
4. The tensioning mechanism according to claim 3 wherein:
   a) said path follows a shaft and said locking mechanism includes a body sleeved on and slidable along said shaft; and
   b) at least one locking cam plate operably positioned in said body so as to allow sliding of said body along said shaft in a forward direction and so as to lock and prevent sliding of said body along said shaft in a reverse direction.
5. The tensioning mechanism according to claim 1 wherein:
   a) said locking mechanism comprises a body mounted on and slidable along a shaft; and
   b) said body operably engages said pulley carrier with said tensioning pulley being rotatably mounted on said pulley carrier.
6. The tensioning mechanism according to claim 1 wherein said tensioning device includes:
   a) a shaft adapted to be fixedly mounted to the frame;
   b) a biasing mechanism mounted on said shaft;
   c) said locking mechanism being mounted along said shaft and being biased by said biasing mechanism to be unidirectionally slideably relative to said shaft; and
   d) said locking mechanism engaging said carrier.
7. The tensioning mechanism according to claim 6 wherein:
   a) said carrier comprises an elongate arm adapted to be pivotally connected to the frame near a first end thereof and having a swingable end opposite said first end; said swingable end operably sliding along said shaft and being directly engaged by said locking mechanism.
8. A motorized mechanism comprising:
   a) a structural frame;
   b) a motor mounted on said frame and driving a power take off pulley about an axis of rotation;
   c) a pair of drive pulleys each rotating about an axis of rotation and adapted to be connected to a respective wheel to drive the wheel;
   d) a tensioning pulley rotating about an axis of rotation; said drive pulleys axes of rotation being non parallel to the axis of rotation of said tensioning pulley;
   e) a twisted belt threaded about each of said pulleys;
   f) a tensioning device operably applying force to said tensioning pulley to urge the axis of rotation of said tensioning pulley along a path and apply tension to said belt; and
   g) a locking mechanism operably connected to said tensioning device; said locking mechanism allowing the axis of said tensioning pulley to move along said path in a first direction and preventing movement along said path in a reverse direction.
9. The mechanism according to claim 8 wherein:
   a) said tensioning pulley is pivotally mounted on a pulley carrier.
10. The mechanism according to claim 9 wherein:
    a) said carrier has a first end and a second end;
    b) said carrier being pivotally mounted to said frame near said first end;
    c) said tensioning pulley being pivotally mounted on said carrier at a first spaced location from said first end; and
    d) said tensioning device operably engaging said carrier at second spaced location from said first end.
11. The mechanism according to claim 10 wherein said tensioning device comprises:
    a) a shaft mounted to said frame;
    b) a spring mounted along said shaft; and wherein
    c) said locking mechanism is mounted along said shaft, biased on one side thereof by said spring and biases against said carrier on an opposite side thereof.
12. The mechanism according to claim 11 wherein:
    a) said carrier second end includes a forked member having two teeth; each of said teeth being positioned on opposite sides of said shaft and said forked member being slidable therealong; said locking mechanism engaging said forked member.
13. The mechanism according to claim 8 wherein:
    a) said tensioning device includes an elongate shaft and biasing means; and
    b) said locking mechanism including a body slideably mounted on said shaft and cooperating with said biasing means so as to be urged in one direction along said shaft; said locking mechanism further including a locking cam plate operably allowing said body to move in a first direction along said shaft and preventing said body from moving in a reverse direction along said shaft.
14. A tensioning mechanism for a drive belt comprising:
    a) a tensioning pulley adapted for operably engaging the drive belt and applying tension thereto;
    b) a tensioning pulley carrier rotatably supporting the tensioning pulley and adapted to be connected to a frame such that an axis of rotation of said tensioning pulley is moveable along a path with respect to said frame;
    c) a tensioning device connected to said tensioning pulley and operably applying a force to said tensioning pulley to urge said pulley axis along said path so as to tension the drive belt;
    d) a locking mechanism connected to said tensioning device and operably allowing said tensioning pulley axis to move in only one direction along said path;
    e) said locking mechanism comprises a body mounted on and slidable along a shaft; and
    f) said body operably engages said pulley carrier with said tensioning pulley being rotatably mounted on said pulley carrier.
15. The tensioning mechanism for a drive belt comprising:
    a) a tensioning pulley adapted for operably engaging the drive belt and applying tension thereto;
    b) a tensioning pulley carrier rotatably supporting the tensioning pulley and adapted to be connected to a frame such that an axis of rotation of said tensioning pulley is movable along a path with respect to said frame;

c) a tensioning device connected to said tensioning pulley and operably applying a force to said tensioning pulley to urge said pulley axis along said path so as to tension the drive belt;

d) said tensioning device includes a shaft adapted to be fixedly mounted to the frame and a biasing mechanism mounted on said shaft;

e) a locking mechanism connected to said tensioning device and operably allowing said tensioning pulley axis to move in only one direction along said path;

f) said locking mechanism being mounted along said shaft and being biased by said biasing mechanism to be unidirectionally slideably relative to said shaft; and g) said locking mechanism engaging said carrier;

h) said carrier comprises an elongate arm adapted to be pivotally connected to the frame near a first end thereof and having a swingable end opposite said first end; said swingable end operably sliding along said shaft and being directly engaged by said locking mechanism.

16. A tensioning mechanism for a drive belt comprising:

a) a tensioning pulley adapted for operably engaging the drive belt and applying tension thereto;

b) a tensioning pulley carrier rotatably supporting the tensioning pulley and adapted to be connected to a frame such that an axis of rotation of said tensioning pulley is moveable along a path with respect to said frame;

c) a tensioning device connected to said tensioning pulley and operably applying a force to said tensioning pulley to urge said pulley axis along said path so as to tension the drive belt;

d) a locking mechanism operably unidirectionally moveable along said path and connected to said tensioning device and operably allowing said tensioning pulley axis to move in only one direction along said path;

e) an elongate arm with said tensioning pulley being rotatably mounted onto said arm;

f) said arm having a first end spaced from a connection with said tensioning pulley; said first end being adapted to be pivotally connected to the frame;

g) said arm operably engaging said tensioning device at a location therealong spaced from said first end such that said tensioning device biases said arm to swing about said first end;

h) said path follows a shaft and includes a body sleeved on and slidable along said shaft; and i) at least one locking cam plate operably positioned in said body so as to allow sliding of said body along said shaft in a forward direction and so as to lock and prevent sliding of said body along said shaft in a reverse direction.

* * * * *